Feb. 15, 1949.       I. F. SCHRECK       2,462,007
AUXILIARY SUPPORTING ROLLER ARRANGEMENT
FOR PALLET TRUCKS
Filed May 3, 1946
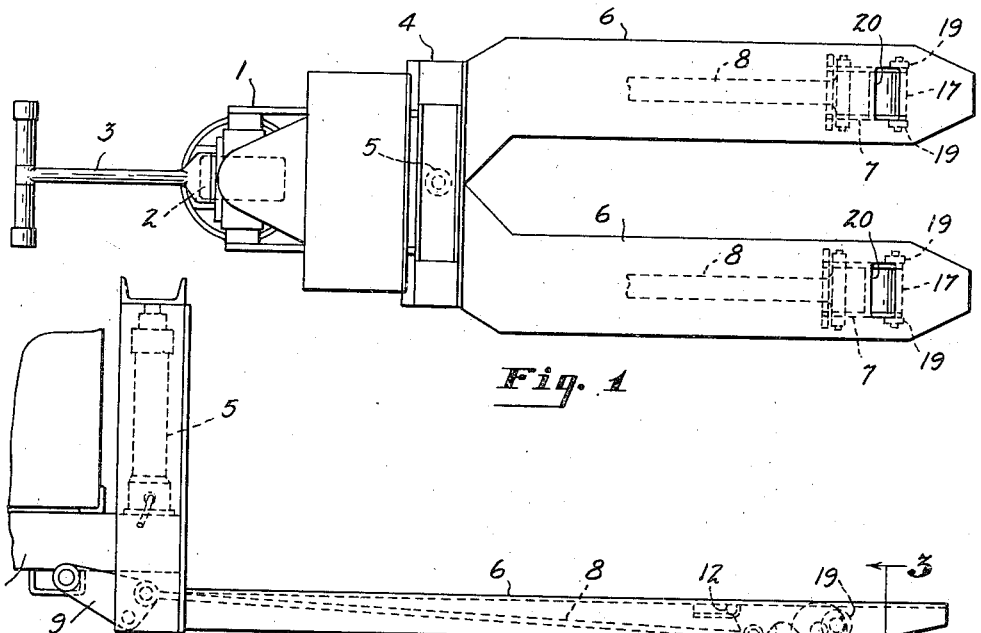
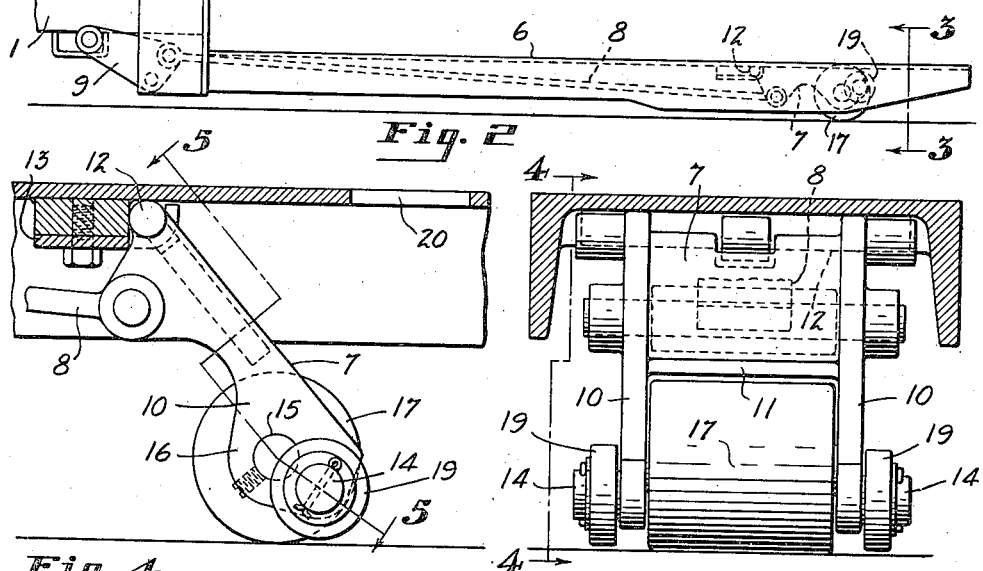
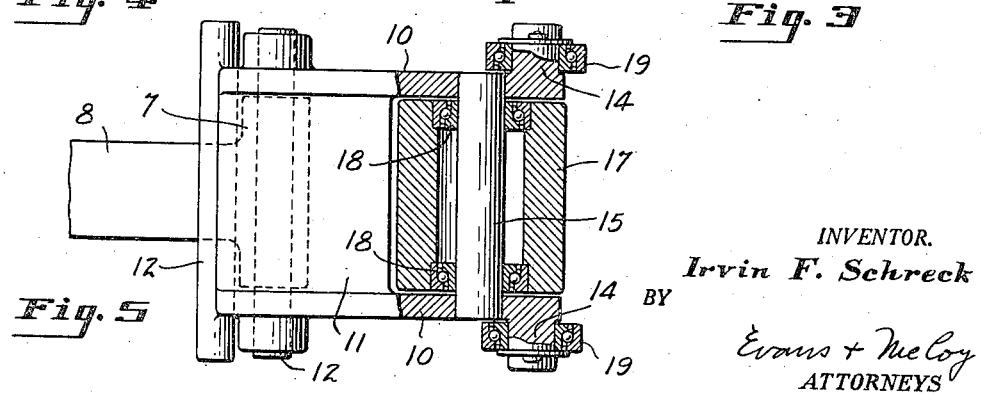
INVENTOR.
Irvin F. Schreck
BY
Evans + McCoy
ATTORNEYS Patented Feb. 15, 1949

2,462,007

UNITED STATES PATENT OFFICE 2,462,007

AUXILIARY SUPPORTING ROLLER ARRANGEMENT FOR PALLET TRUCKS

Irvin F. Schreck, Cleveland Heights, Ohio

Application May 3, 1946, Serial No. 667,131

5 Claims. (Cl. 280—44)

This invention relates to lift trucks which have roller supporting load carrying members that are adjustable to a position close to a floor surface, and particularly to trucks having load lifting members that can be backed under a pallet and elevated to lift and carry the pallet.

The load engaging portions of trucks such as pallet trucks must be supported upon rollers of small diameter in order to enable them to enter the space beneath the pallet. Because of the small diameter of the rollers, difficulty is often experienced in moving such trucks over irregularities on a floor surface and in moving the trucks onto and off from elevator platforms. It is difficult to stop the ordinary elevator with its platform at the exact level of a floor. If the elevator platform is offset an inch or so above the floor surface difficulty is experienced in moving a truck onto the elevator platform, and if the platform is offset an inch or so below the floor surface difficulty is experienced in moving a truck off of the elevator platform.

The present invention has for its object to provide means for facilitating the travel of trucks of the character referred to over an irregular floor surface, or to or from an elevator platform.

With the above and other objects in view, the invention may be said to comprise the device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a fragmentary plan view of a pallet truck to which the invention is applied;

Fig. 2 is a side elevation of the load lifting portion of the truck;

Fig. 3 is a section taken on the line indicated at 3—3 in Fig. 2;

Fig. 4 is a section taken on the line indicated at 4—4 in Fig. 3, and

Fig. 5 is a section taken on the line indicated at 5—5 in Fig. 4.

In the accompanying drawings the invention is shown applied to a truck of the type disclosed in my Patent No. 2,359,493, granted October 3, 1944. A tractor body 1 is supported upon a front wheel 2 which is swiveled in the tractor body and motor driven and a steering handle 3 is pivoted to the turntable in which the supporting wheel is mounted. The truck is provided with a vertically movable load carrier 4 which is adapted to be moved vertically by means of a fluid pressure cylinder 5 mounted upon the rear end of the tractor body. The load carrier 4 has forwardly projecting pallet engaging arms 6 which are horizontally disposed and which are provided with supporting legs 7 adjacent their rear ends. The supporting legs are pivoted to swing vertically beneath the arms 6 and means is provided for automatically swinging the legs 7 downwardly as the carrier 4 is being elevated, the legs 7 being actuated by means of links 8 which extend forwardly to levers 9 connected to the tractor body 1 and load carrier 4 to be automatically actuated when the carrier is lifted. The pivoted supporting legs 7 are in the form of downwardly facing channels having side plates 10 and a flat top plate 11 which may be welded together to provide a unitary structure. A pivot pin 12 is rigidly secured to the forward end of the leg 7 and is journaled in a bearing member 13 attached to the under side of the arm 6.

Each of the supporting legs is provided adjacent its free end with trunnions 14 which are carried by the side plates 10 exteriorly thereof. The trunnions 14 are coaxial and disposed parallel with an axle 15 that is journaled in a widened portion 16 of the side plates 10 inwardly of the trunnions 14. A main supporting roller 17 is mounted upon ball bearings 18 between the side plates 10 and these rollers engage the floor in all positions of the supporting leg. Booster rollers 19 which may be identical with or similar to the bearings 18 are mounted upon the trunnions 14. The auxiliary or booster rollers 19 are of less diameter than the rollers 15 but by reason of the fact that the trunnions 14 are disposed alongside the roller 17 outwardly of the axle 15, the rollers 19 move toward and away from the floor as the legs are swung downwardly and upwardly and are in close proximity to the floor surface when the legs 7 are swung down to their lowermost positions. The auxiliary or booster rollers 19 must be considerably smaller than the rollers 17 so that they will not interfere with the required movements of the legs 7 by engagement with the floor or arm 6, but they should be large enough to have effective rolling action and the desired load carrying capacity. In order to provide sufficient space between the trunnions 14 and the floor to accommodate auxiliary booster rollers of the desired size, the axis of the trunnions 14 is above the plane that includes the axis of the roller 17 and the pivotal axis of the leg 7 in all positions of the leg. The rollers 19 being disposed rearwardly of the axle 15 and spaced slightly above the floor surface, will engage with a ledge projecting above the portion of the floor surface engaged by the roller 17 before the roller 17 engages to momentarily support and slightly lift the load before the roller 17 engages the ledge. Since the treads of the booster rollers extend across the tread of the main roller very close to the point of engagement of the tread of the main roller with the floor the booster rollers and the main roller cannot straddle a stick or rod or a narrow ridge on the floor surface and in passing over such a stick, rod or ridge the load is transferred smoothly from the booster roller to the main roller. For example, in moving a truck onto or off of an elevator platform, the rollers 19 of each leg serve as boosters to lift the roller 17 and assist it to pass over the ledge when there is a slight difference in the elevation of the platform and floor surface.

The top of the leg 7 is preferably flat so that in the lowermost position of the load carrying arms 6 the top of the leg 7 rests against the flat underside of the arms 6 and, in order to permit the rollers 17 to be of the greatest possible diameter, these rollers project slightly above the tops of the arms 7 and into the slots 20 formed in the arms 6 when the arms 6 are in their lowermost position, as shown in Fig. 2.

It is to be understood that variations and modifications of the specific devices herein shown and described for purposes of illustration, may be made without departing from the spirit of the invention.

What I claim is:

1. A lift truck having a vertically adjustable load carrying member, means for adjusting said member including a supporting leg pivoted to said member and serving as a lift lever, and main and auxiliary supporting rollers carried by said leg, said rollers being mounted side by side with their axes parallel and at different distances from the pivot of said leg, said main roller extending past the axis of the auxiliary roller and being engageable with the floor at all times and said auxiliary roller being so positioned with respect to the main roller that it moves toward and away from the floor during pivotal movements of the leg and is supported out of engagement with the floor but in close proximity to the floor in one extreme position of said leg.

2. A lift truck having a vertically adjustable load carrying member, means for adjusting said member including a supporting leg pivoted to said member and serving as a lift lever, and main and auxiliary supporting rollers carried by said leg, said auxiliary roller being mounted beside the main roller with its axis parallel to the axis of the main roller and farther from the leg pivot, said main roller extending past the axis of the auxiliary roller and being engageable with the floor in all positions of adjustment of the leg and said auxiliary roller being so positioned that it is shifted toward the floor as said leg is swung downwardly and is in close proximity to the floor in the lowermost position of said supporting leg.

3. A lift truck having a vertically adjustable load carrying member, means for adjusting said member including an adjustable supporting leg pivoted at one end to the under side of said member and movable downwardly from a position in which it lies against the under side of said member, said leg having laterally spaced arms provided with outwardly projecting trunnions adjacent their outer ends, an axle mounted in said arms inwardly of said trunnions, a main supporting roller mounted on said axle and between said arms, and extending past said trunnions, and auxiliary rollers mounted on said trunnions and alongside said main roller, said auxiliary rollers being so positioned that they are shifted toward the floor as the leg is swung downwardly and are brought into close proximity to the floor when the leg is in its lowermost position.

4. In a lift truck having a vertically adjustable load carrying member having a flat bottom face, an adjustable supporting leg pivoted to the under side of said member to swing vertically and having a flat longitudinal face engageable with said flat bottom face of said member, said leg having parallel side plates provided with axially aligned trunnions adjacent their free ends, an axle journaled in said side plates inwardly of said trunnions, a main roller mounted on said axle between said plates and extending past said trunnions and booster rollers of smaller diameter than said main roller mounted on said trunnions alongside said main roller, said booster rollers being so positioned that they are spaced slightly above the floor in the lowermost position of the leg and beneath said flat bottom face of the load carrying member in the uppermost position of the leg.

5. In a pallet truck, a horizontally disposed vertically movable load carrying arm, supporting means for said arm including a lifting and supporting leg beneath the arm and connected at one end to the arm to swing about a horizontal pivotal axis, said leg being movable about its pivotal axis downwardly from a position against the under side of the arm to a lowermost inclined position to elevate said arm to load carrying position, a supporting roller mounted on said leg adjacent its free end with its axis parallel to said pivotal axis and engaging the floor in all positions of the leg, and an auxiliary roller of less diameter than the supporting roller mounted on said leg to turn about an axis parallel to the axis of the supporting roller and at a greater distance from said pivotal axis than the axis of the supporting roller, the axis of said auxiliary roller being above the plane of said pivotal axis and said supporting roller axis in all positions of the leg, the position and size of said auxiliary roller being such that its periphery is closely adjacent but out of contact with the floor in the lowermost position of the leg and closely adjacent the arm in the uppermost position of the leg.

IRVIN F. SCHRECK.

REFERENCES CITED

The following references are of record in the file of this patent:

UNITED STATES PATENTS

| Number | Name | Date |
|---|---|---|
| 2,178,647 | Raymond et al. | Nov. 7, 1939 |
| 2,234,925 | Hastings, Jr. | Mar. 11, 1941 |
| 2,242,326 | Quayle | May 20, 1941 |
| 2,243,915 | Mueller | June 3, 1941 |
| 2,359,493 | Schreck | Oct. 3, 1944 |

FOREIGN PATENTS

| Number | Country | Date |
|---|---|---|
| 106,353 | Switzerland | Sept. 16, 1924 |